United States Patent
Müller

[19]

[11] Patent Number: 6,008,956
[45] Date of Patent: Dec. 28, 1999

[54] CARRYABLE OPTICAL MAGNIFYING DEVICE

[75] Inventor: Norbert Müller, Asslar, Germany

[73] Assignee: Hensoldt AG Hensoldt

[21] Appl. No.: 09/197,134

[22] Filed: Nov. 20, 1998

[30] Foreign Application Priority Data

Nov. 20, 1997 [DE] Germany ............... 297 20 593 U

[51] Int. Cl.⁶ .................... G02B 7/02; G03B 17/48
[52] U.S. Cl. ................................. 359/811; 396/423
[58] Field of Search ........................... 359/811, 812; 224/615; 396/423, 424; 42/428

[56] References Cited

U.S. PATENT DOCUMENTS 5,816,464  10/1998  Seiler ............................ 224/615

FOREIGN PATENT DOCUMENTS

| 32 33 801 A1 | 3/1984 | Germany | A44B 21/00 |
| 80 06 381 U | 7/1984 | Germany | G02B 23/16 |
| 34 19 298 A1 | 11/1985 | Germany | G02B 23/16 |
| 36 17 423 A1 | 11/1987 | Germany | A44B 11/06 |

*Primary Examiner*—Georgia Epps
*Assistant Examiner*—Saeed Seyrafi

[57] ABSTRACT

A carryable optical magnifying device can be worn during use by the user, and relates in particular to binoculars or field-glasses with a carrying strap attached to the housing of the magnifying device. The carrying strap is passed outward laterally of the eyepiece region of the magnifying device through an opening in the outer portion of the housing. The opening has substantially the same cross section as the carrying strap. The carrying strap has at its end within the housing a thickening that is larger than the opening for the carrying strap in the outer portion of the housing. An inner cavity into which the thickening is inserted, is formed within the housing with the cooperation of a clamp member.

7 Claims, 1 Drawing Sheet

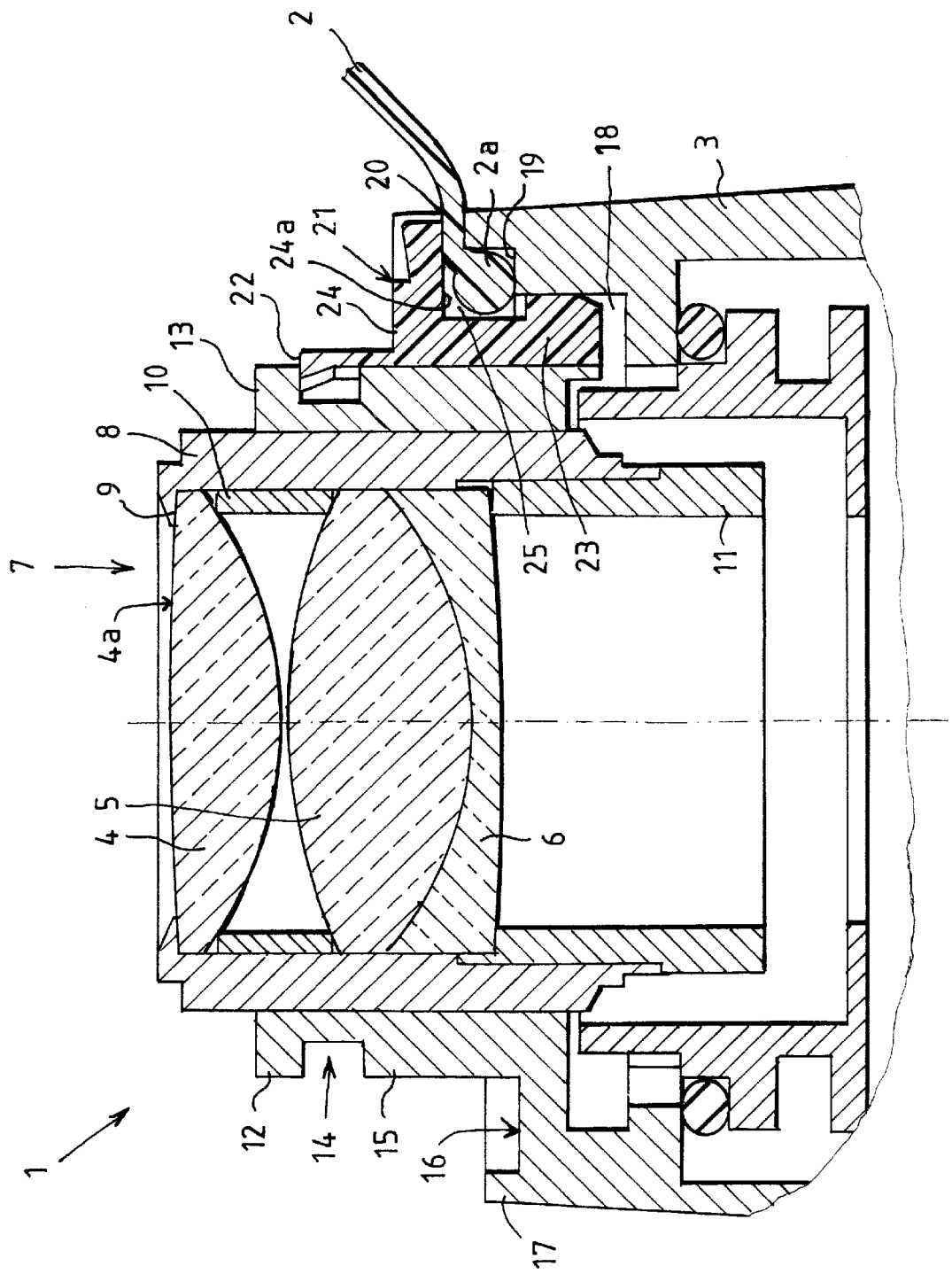

CARRYABLE OPTICAL MAGNIFYING DEVICE

BACKGROUND OF THE INVENTION

1. Field of the Invention

The invention relates to a carryable optical magnifying device that can be carried during use by the user, and relates in particular to binoculars or field-glasses, and particularly to a binocular device, with a carrying strap attached to the housing of the magnifying device.

2. Description of Relevant Art

Carrying strap fastenings are known from German Patents DE 80 06 381, DE 36 17 423, DE 32 33 801 and DE 34 19 298, having the fastening elements arranged outside the binoculars. A disadvantage of this is that the fastening elements can become hooked to the clothing of the user of the binoculars.

Furthermore, it is known in binoculars to fasten a round cord with thickened ends in the ends of two hinges toward the eyepiece by means of screws, which reduce the diameter of the cord. However, this solution functions only for round cords and for binoculars with two hinge axes between the halves of the binoculars, and has the disadvantage that the distance between the two cord fastenings is very small, to that it can very quickly lead to a twisting of the binoculars during wearing, so that the binoculars cannot be worn in a secure position.

SUMMARY OF THE INVENTION

The invention has as its object to provide binoculars, which have a secure carrying fastening without external holding parts, insuring a reliable position stabilization of the binoculars when worn.

This object is attained according to the invention by a carryable optical magnifying device that can be worn during use by the user, with a carrying strap attached to the housing of the magnifying device.

This magnifying device can in particular be binoculars or field-glasses; the invention is particularly suitable for a binocular device.

According to the invention, the carrying strap is passed outward laterally of the eyepiece region through an opening in the outer portion of the housing, where the opening has substantially the same cross section as the carrying strap. The carrying strap has at its end within the housing a thickening which is larger than the opening for the carrying strap in the outer portion of the housing. An inner cavity, into which the thickening is inserted, is formed within the housing with the cooperation of a clamp member.

The solution according to the invention firstly provides a carrying strap fastening, particularly when the carrying strap has a rectangular cross section, which of itself gives a positionally stable installation of the carrying strap without externally visible fastening elements.

Preferably the recess in the outer portion of the housing forms the lower side and the lateral walls of the opening in the housing for the carrying strap, and a portion of the underside of an upper thickening of the clamp member forms the upper side of the said opening. This can take place so that a closed external housing surface is obtained.

The roof of the inner cavity is then preferably formed by a portion of the underside of the upper thickening of the clamp member.

The inner cavity to receive the thickened end of the carrying strap is formed between the inner wall of the outer portion of the housing and the clamp body, and is thus to be located completely within the housing. This provides a secure fastening of the carrying strap to the housing.

A support surface is formed below the recess and laterally of the inner surface of the outer portion of the housing, and the thickening of the carrying strap is to abut on this support surface: a precise positional fixation of the carrying strap in the housing is thereby obtained and cannot slip to one side. When the upper end of the clamp member is constructed as a snap hook, with the snap hook engaging in an opening on the outer surface of an eyepiece housing which lies within the outer portion of the housing, the exact positional fixing of the clamp member relative to the housing is insured and can also resist strong forces acting from outside, particularly on the carrying strap.

BRIEF DESCRIPTION OF THE DRAWINGS

The invention is described in further detail hereinbelow by means of a preferred embodiment, with reference to the single accompanying drawing, in which FIG. 1 draws a cross section through an eyepiece portion of a binocular.

The following preferred embodiment has no limitative character for the invention and includes further advantageous embodiments of the invention.

DETAILED DESCRIPTION OF PREFERRED EMBODIMENTS

FIG. 1 shows a cross section through the eyepiece portion of a binoculars (1) with the fastening of a carrying strap (2) according to the invention to the housing (3) of the binoculars.

The lenses (4, 5, 6) of the eyepiece (7) are held in an eyepiece housing (8), where the uppermost lens (4), with a flat surface (4a) on the eyepiece side, is supported against a ring (9) which runs around the eyepiece housing (8). A distance piece (10) provides for the desired distance between the uppermost lens (4) and the following two-lens cemented element (5, 6). A locating element (11) is screwed into the eyepiece housing (8) and provides an abutment surface for the lowermost lens (6) of the two-member cemented element (5, 6), the lenses (4, 5, 6) being thereby located in a defined manner with respect to each other in the eyepiece (7).

The eyepiece housing (8) is screwed into the housing (3) of the binoculars (1) with only one axis of rotation between the two halves (not shown in the drawing) of the binoculars. In the eyepiece region, the housing (3) has a first, tubular housing portion (12) which is inwardly open, with an internal thread to receive the eyepiece housing (8). This inner housing portion (12) has at its eyepiece-side end a first thickened circular ring (13), which is adjoined by a groove (14) which runs around the housing portion (12). After the groove (14), the inner housing portion (12) returns to its original thickness and forms a second thickened circular ring (15). A horizontal separating surface (16) is located at the lower end of this second thickened circular ring (15), and is outwardly closed off by a second outer tubular housing portion (17). The outer surface of this outer housing portion (17) can be gripped when the binoculars (1) are in use.

There is at least one rectangular opening (18) in the separating surface (16). This opening (18) is arranged at the farthest from the rotation axis (not shown in the drawing) of the binoculars (1) and is used for the attachment of the carrying strap (2). The opening (18) has towards its upper end an abutment surface (19) which extends from the inner side of the outer housing portion (17) as far as about the middle of the opening (18). This abutment surface (19) is arranged so that the thickened end (2a) of the carrying strap (2) can be completely received in the opening (18).

The carrying strap (2) has a rectangular shape, and has at its ends a circular cylindrical thickening (2a) of (hardened) plastic, with the cylinder axis oriented perpendicularly of the strap axis.

A recess (20) is located in the outer housing portion (17) and reaches as far as the upper edge; the recess (20) has a floor and two lateral walls. The recess (20) is open upward.

A clamp member (21) serves to fasten the carrying strap (2) in the opening (18) of the separating surface (16) and for fixing it in position relative to the housing of the binoculars (1). The clamp member (21) has at its upper end a snap hook (22) which engages, in the inserted, clamping state of the clamp member (21) in the groove (14) ninning around the outer surface of the inner housing portion (12) and thus insures a releasable fastening of the clamp member (21) between the inner (12) and the outer (17) portions of the housing. The clamp member (21) has at its lower end an outward-facing, thickened end (23) with a lower, outward-facing slight bevel, which can easily be introduced into the opening (16), and which closes this opening (16) slightly below the abutment face (19) for the thickened end (2a) of the carrying strap.

A further, outward-facing thickening (24) is arranged between the snap hook (22) and the thickened end (23) of the clamp member (21). This second thickening (24) has a flat underside (24a). The outer end of the second thickening (24) is shaped so that it fits exactly into the recess (20) in the outer housing portion (17) and forms together with this a closed, rectangular opening in the housing (3) for the carrying strap (2) to pass through, without a portion of this thickening (24) projecting beyond the outer surface of the binoculars housing (3), so that a closed outer surface is formed, the opening being dimensioned such that it is only negligibly greater than the cross section through the carrying strap (2). A cavity (25) is defined in the interior of the binoculars housing (3) by the outer housing portion (17) and the clamp member (21), and serves to receive the thickened end (2a) of the carrying strap (2) fastened in it. The opening in the binoculars housing (3) defined by the recess (20) and the clamp member (21) is thus dimensioned such that the thickened end (2a) of the carrying strap (2) cannot pass through this opening in the inserted state of the clamp member (21). On the other hand, the carrier strap (2) can easily be fastened and fixed by the clamp member (21) to the housing (3) of the binoculars (1).

The clamp member (21) is fastened by the snap hook (22) and the lower, thickened end (23) of the clamp member (21) such that even large forces cannot remove it from its position.

I claim:

1. A carryable optical magnifying device that can be carried during use by a user, comprising:
    a housing (3) having an outer portion (12) and an inner cavity (25),
    an eyepiece region,
    a clamping member (21), and
    a carrying strap (2) attached to said housing (3), said carrier strap (2) passing outward laterally of said eyepiece region through an opening in said outer portion (17) of said housing (3),
    said opening having substantially the same cross-section as said carrying strap (2),
    said carrying strap (2) having a thickening (2a) at an end thereof located within said inner cavity (25) of said housing (2),
    said thickening (2a) being larger than said opening for carrying said strap (2) in said outer portion of said housing (3),
    said inner cavity (25) being formed within said housing (3) in cooperation with said clamping member (21).

2. The carryable optical magnifying device according to claim 1, in which said carrier strap (2) has a rectangular cross-section.

3. The carryable optical magnifying device according to claim 1, further comprising a recess (20) in said outer portion (17) of said housing (3) that form a lower side and lateral walls of said opening in said housing (3) for said carrier strap (2), said clamping member (21) having an upper thickening (24) with an under side including a portion that forms an upper side of said opening.

4. The carryable optical magnifying device according to claim 1, further comprising a roof of said inner cavity (25) formed by an underside of an upper thickening of the clamp member (21).

5. The carryable optical magnifying device according to claim 1, in which said inner cavity (25) is formed between an inner wall of said outer portion (17) of said housing (3) and said clamping member (21).

6. The carryable optical magnifying device according to claim 3, further comprising an abutment surface (19) formed beneath said recess (20) and laterally of an inner surface of said outer portion (17) of said housing (3), against which said thickening (2a) of said carrying strap (2) abuts.

7. The carryable optical magnifying device according to claim 1, further comprising an eyepiece housing (8), said clamping member (21) having an upper end formed as a snap hook (22) that engages in a groove (14) on the outer surface of an inner housing portion (12) that receives said eyepiece housing (8).

* * * * *